Patented Jan. 16, 1934

1,943,497

UNITED STATES PATENT OFFICE 1,943,497

METHOD FOR PRODUCING FINELY DIVIDED HYDRATED CALCIUM SULPHATE

Foord von Bichowsky, Glendale, Calif.

No Drawing. Application March 19, 1932
Serial No. 600,075

2 Claims. (Cl. 23—122)

The present invention relates especially to the production of finely divided hydrated calcium sulphate by the action of chemical substances upon crystalline calcium sulphate that contains up to and including two molecules of water of crystallization.

I am aware that it has been proposed to prepare anhydrous calcium sulphate by the action upon gypsum of sulphuric acid of a specific gravity varying between 1.84 and 1.6 and which should not fall below 1.3 during the dehydrating operation. British Patent No. 319,228 of 1929.

I have now found that if sulphuric acid of a specific gravity below 1.3 be allowed to act upon acicular crystals of calcium sulphate that one may obtain a hydrated form of calcium sulphate of extreme fineness.

I have found it preferable to employ a temperature below 100° C., and to have the heating begin very slowly and extend over a considerable period.

As an example of my process: One takes a moist filter cake of crystals of the acicular or needle like variety of gypsum, said cake containing about 50 per cent by weight of mechanically held water, and adds to it, with cooling and stirring, one third of the wet cake's weight of 60° Baumé sulphuric acid. One thus obtains a mushy mixture of unchanged acicular crystals suspended in a weak sulphuric acid, said acid having a specific gravity below 1.3.

The so-obtained mush is now slowing warmed during 24 hours to about 100° C., or until a sample inspected under the microscope shows that the disintegration of the original acicular crystals is as complete as desired.

By carrying on the reaction in an apparatus having a classifying action one may obtain very uniform microscopic particles of hydrated calcium sulphate. Particles of this type are useful for making composite pigments and for other purposes. One can, if desired, act upon dried acicular hydrated calcium sulphate crystals with dilute sulphuric acid of say 1.25 specific gravity. Or other reagents may be used that are able to disintegrate or split the acicular crystals without, however, appreciably dehydrating them.

One may, for example, employ zirconium acid sulphate as a splitting agent.

If desired the disintegrated crystals of hydrated $CaSO_4$, however obtained, may be washed with water or otherwise freed from the splitting agent.

Now having described my invention I claim:

1. Method for producing finely divided hydrated calcium sulphate which consists in acting upon heating acicular hydrated calcium sulphate material with an aqueous solution of a sulphuric acid containing substance, in which solution the concentration of the free sulphuric acid does not exceed that of sulphuric acid of specific gravity 1.3, and then heating the acicular material with said acid solution until the acicular material disintegrates without, however, being appreciably dehydrated.

2. Method for producing finely divided hydrated calcium sulphate which consists in acting upon acicular hydrated calcium sulphate material with sulphuric acid having a specific gravity less than 1.3 and heating until the acicular material disintegrates without, however, being appreciably dehydrated.

FOORD VON BICHOWSKY.

CERTIFICATE OF CORRECTION.

Patent No. 1,943,497.  January 16, 1934.

FOORD von BICHOWSKY.

It is hereby certified that error appears in the printed specification of the above numbered patent requiring correction as follows: Line 31, for "slowing" read slowly; and line 74, claim 1, strike out the word "heating"; and that the said Letters Patent should be read with these corrections therein that the same may conform to the record of the case in the Patent Office.

Signed and sealed this 6th day of March, A. D. 1934.

F. M. Hopkins (Seal)  Acting Commissioner of Patents.